US007007097B1

(12) United States Patent
Huffman et al.

(10) Patent No.: US 7,007,097 B1
(45) Date of Patent: Feb. 28, 2006

(54) METHOD AND SYSTEM FOR COVERING MULTIPLE RESOURCCES WITH A SINGLE CREDIT IN A COMPUTER SYSTEM

(75) Inventors: William A. Huffman, Los Gatos, CA (US); Michael L. Anderson, Chippewa Falls, WI (US); Gregory M. Thorson, Altoona, WI (US); Susan Garcia, Eau Claire, WI (US); Daniel L. Kunkel, Chippewa Falls, WI (US)

(73) Assignee: Silicon Graphics, Inc., Mountain View, CA (US)

( * ) Notice: Subject to any disclaimer, the term of this patent is extended or adjusted under 35 U.S.C. 154(b) by 775 days.

(21) Appl. No.: 09/910,584

(22) Filed: Jul. 20, 2001

Related U.S. Application Data

(60) Provisional application No. 60/219,937, filed on Jul. 20, 2000.

(51) Int. Cl.
 G06F 15/16 (2006.01)
 G06F 5/00 (2006.01)
 G06F 3/00 (2006.01)
 G06F 9/00 (2006.01)
 G06F 13/14 (2006.01)
(52) U.S. Cl. .................. 709/232; 710/57; 710/306; 710/8; 710/11; 710/20; 713/1
(58) Field of Classification Search .............. 710/306, 710/8, 52; 713/1; 709/232
See application file for complete search history.

(56) References Cited

U.S. PATENT DOCUMENTS

| 5,265,091 | A | * | 11/1993 | van Landegem | ............ | 370/232 |
| 5,933,618 | A | * | 8/1999 | Tran et al. | .................. | 712/217 |
| 6,502,189 | B1 | * | 12/2002 | Westby | ......................... | 713/1 |
| 6,611,891 | B1 | * | 8/2003 | Hewitt et al. | ............... | 710/306 |

* cited by examiner

*Primary Examiner*—Dung C. Dinh
*Assistant Examiner*—Chad Zhong
(74) *Attorney, Agent, or Firm*—Baker Botts L.L.P.

(57) ABSTRACT

A method and system for communicating to a sender an availability of receiving a new message includes providing buffers having at least one corresponding slot for storing a message and providing a credit signal that communicates to the sender only when all of the buffers have at least one of the corresponding slot available for storing a new message. Each of the buffers is monitored for whether at least one of the corresponding slots is available for storing the new message. A corresponding receiver counter is provided for each of the buffers. Each receiver counter is decremented when all of the buffers have at least one corresponding slot available for storing the new message. Each of the buffers is configured to receive a corresponding particular message type. The particular message type of the new message is determined. The new message is loaded into the corresponding slot of one of the buffers which is configured for receiving the particular message type of the new message. The counter of each of the buffers in which the new message was not loaded is incremented. After the loaded new message is freed from the buffer in which it was loaded, the counter of the buffer in which the new message was loaded is incremented.

26 Claims, 2 Drawing Sheets

METHOD AND SYSTEM FOR COVERING MULTIPLE RESOURCCES WITH A SINGLE CREDIT IN A COMPUTER SYSTEM

RELATED APPLICATIONS

This Application claims the benefit of U.S. Provisional Application No. 60/219,937 filed Jul. 20, 2000.

TECHNICAL FIELD OF THE INVENTION

The present invention relates in general to flow control of messages in a computer system, and more particularly to using a single credit to control transmission of messages in a system with multiple resources.

BACKGROUND OF THE INVENTION

In a conventional computer system, messages are sent to and from various memories and interfaces. For example, the processor interface transmits messages to the memory/directory interface. However, the message receiver does not always have available space to receive the sender's message. One system for ensuring that the receiver has sufficient space for receiving the message is for the sender to request a grant from the receiver prior to sending the message. If space is available for the message, the sender is granted permission to send the message. Such a system has an inherent delay while the availability of the grant is determined.

An alternative system utilizes the concept of a credit mechanism. In a credit mechanism system, grants are made ahead of requests and are stored up so that there is no delay in determining whether a grant is available. In a credit system, the message sender and message receiver each have a counter. The sender counter tracks how many resources the sender knows are available. The receiver counter tracks how many resources are available that it has not yet told the sender about. The messages are received in a first-in-first-out (FIFO) buffer of the receiver where the messages await arbitration and a slot in memory. For example, the FIFO buffer may be sixteen slots deep and the arbitration queue may have 64 slots.

When the sender receives a signal such as a pulse from the receiver that the receiver has space in the FIFO buffer for a message, the sender counter is incremented. The pulse from the receiver represents one credit. When the sender counter is greater than zero, the sender can send a message. Upon the sender sending a message, the sender counter is decremented by one credit.

When the receiver counter is greater than zero, the receiver sends a pulse to the sender (which as described above causes the sender counter to be incremented) and decrements the receiver counter. In other words, the receiver transferred a credit to the sender. When a message is removed from the FIFO buffer into the arbitration queue, the receiver counter is incremented, representing an additional credit that is available but that has not yet been transmitted to the sender.

Computer systems, however, often need to send multiple message types with different resource utilization patterns and thus would require a different type of credit for each message type and either a complex channel or multiple channels for transmitting credits and messages, adversely affecting both latency and bandwidth.

SUMMARY OF THE INVENTION

From the foregoing, it may be appreciated that a need has arisen for a technique to handle multiple resources with a single type of credit. In accordance with the present invention, a method and system for covering multiple resources with a single credit are provided that substantially eliminate or reduce disadvantages and problems associated with conventional computer systems.

According to an embodiment of the present invention there is provided a method and system for communicating to a sender an availability of receiving a new message. The system includes providing a plurality of buffers each having at least one corresponding slot for storing a message and providing a credit signal that communicates to the sender only when it is determined that all of the buffers have at least one of the corresponding slots available for storing a new message. Each of the buffers is monitored to determine whether at least one of the corresponding slots is available for storing the new message. A corresponding counter is provided for each of the buffers. Each counter is decremented when all of the buffers have at least one corresponding slot available for storing the new message.

In another aspect of the present invention, each of the buffers is configured to receive a corresponding particular message type. The new message is received from the sender, the particular message type of the new message is determined, and the new message is loaded into the corresponding slot of one of the buffers which is configured for receiving the particular message type of the new message.

In a further aspect of the present invention, the counter of each of the buffers in which the new message was not loaded is incremented. After the loaded new message is freed from the buffer in which it was loaded, the counter of the buffer in which the new message was loaded is incremented.

In another aspect of the invention, each of the buffers includes corresponding slots that are initialized. Prior to loading a first message into the initialized corresponding slots of the buffers, each of the counters are set to equal the number of the initialized corresponding slots in its corresponding buffer.

In a further aspect of the present invention, six buffers are included.

In yet another aspect of the present invention, each of the buffers is configured with a different particular message type.

Other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
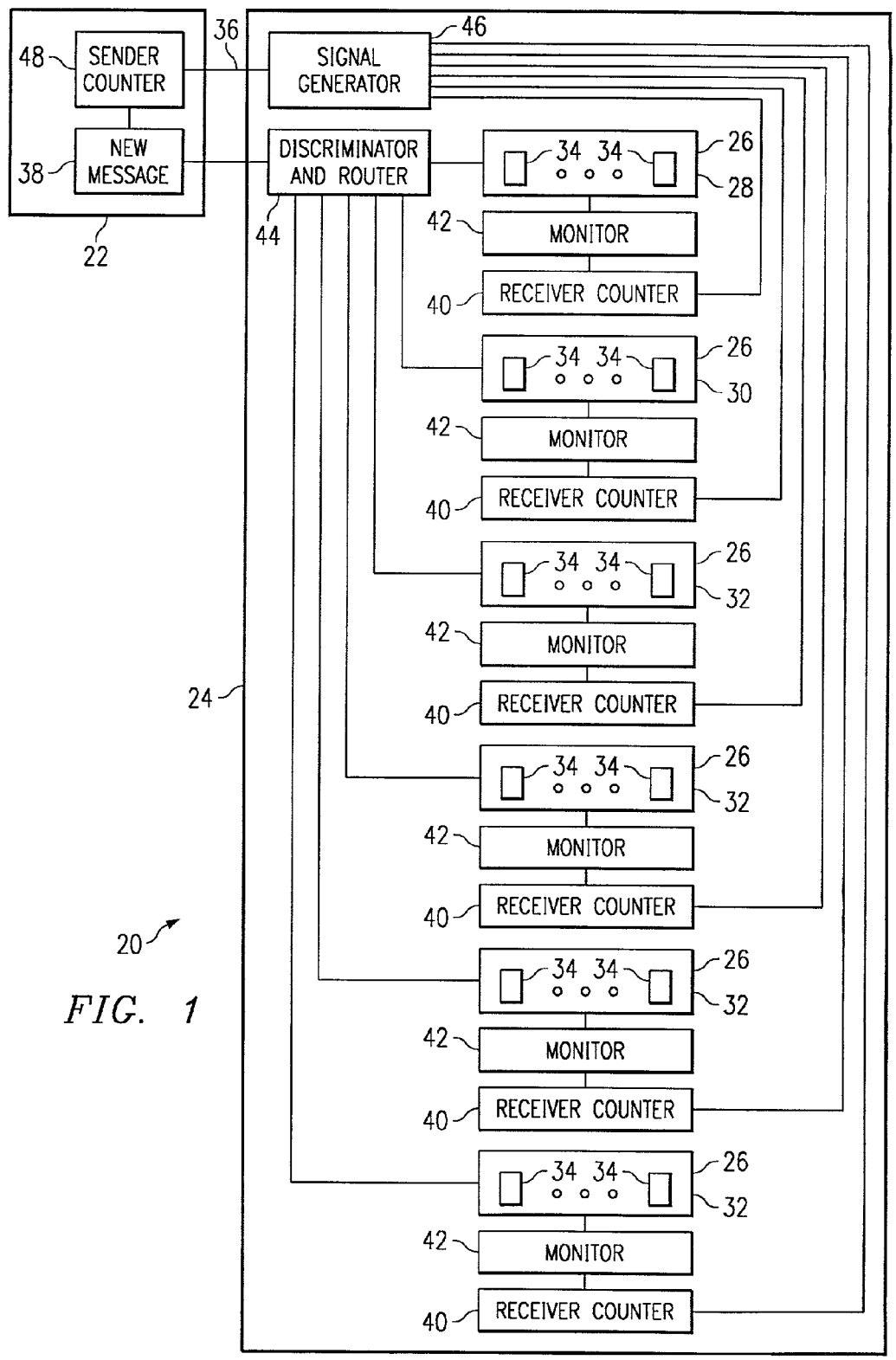
FIG. 1 is a block diagram illustrating an embodiment of the present invention.

FIG. 1 shows an embodiment of the present invention that includes in a computer system 20, a message sender 22 and a message receiver 24. The message receiver 24 includes six buffers 26—a write buffer 28, a read buffer 30 and four victim buffers 32. In other embodiments, the number of buffers can be greater or less than six. Each buffer 26 has at least one corresponding slot 34 for storing a message. In this embodiment the write buffer has slots for 32 cache lines, the read buffer has slots for 32 cache lines and each of the victim buffers has slots for 48 cache lines. Only two slots 34 are depicted in the buffers 26 shown in FIG. 1 for the sake of simplicity. The message receiver 24 is capable of providing a credit signal over a line 36 that communicates to the message sender 22 only when all of the buffers 26 have at least one of the corresponding slots 34 available for storing a new message 38.

A corresponding receiver counter 40 is provided for each of the buffers 26. The receiver counters 40 are initialized. Initially each receiver counter 40 is set to a number equal to the number of the slots 34 for messages that are available for the type of message corresponding to that buffer 26. In other words, the receiver counter 40 corresponding to the write buffer 28 is initially set to thirty-two because that is the number of slots 34 in the write buffer. Each of the buffers 26 is monitored by a monitor 42 to determine whether at least one of the corresponding slots 34 is available for storing the new message 38. However, the monitoring can be direct or indirect, i.e., rather than determining the status of the buffer 26 directly, the system may instead keep track of the new messages 38 loaded into and freed from the buffer 26. Further, one monitor 42 may monitor more than one buffer 26.

Each receiver counter 40 is decremented when all of the buffers 26 have at least one corresponding slot 34 available for storing the new message 38. When a new message 38 is received, its message type is determined by a message type discriminator and router 44 (although separate devices or software programs may be used for each of these two functions) and the new message 38 is directed to the buffer or buffers 26 corresponding to the particular message type of the new message. Once the new message 38 is directed to the appropriate buffer or buffers 26, the receiver counter for each of the buffers 26 that did not receive the new message 38 is immediately incremented. When the new message 38 is freed (i.e., it arrives but is not needed, later it is not needed or the system is finished needing the message), the receiver counter 40 corresponding to that buffer 26 is incremented. If a situation arises wherein all the buffers 26 receive the new message 38, then none of the receiver counters 40 are incremented at that juncture. When all the buffers 26 are finished with the new message 38, all the receiver counters 40 are incremented. When the receiver counters 40 for all six of the buffers 26 are greater than zero, a credit signal via the line 36 from a signal generator 46 is sent to the message sender 22 and all six receiver counters 40 for buffers 26 are decremented one credit.

The message sender 22 includes a sender counter 48. When the message sender 22 receives the credit signal on line 36, The sender counter 48 is incremented by one credit. When the message sender 22 sends a new message 38, the sender counter 48 is decremented one credit. The message sender 22 only sends new messages 38 when the sender counter 48 is greater than zero.

Figure 2:
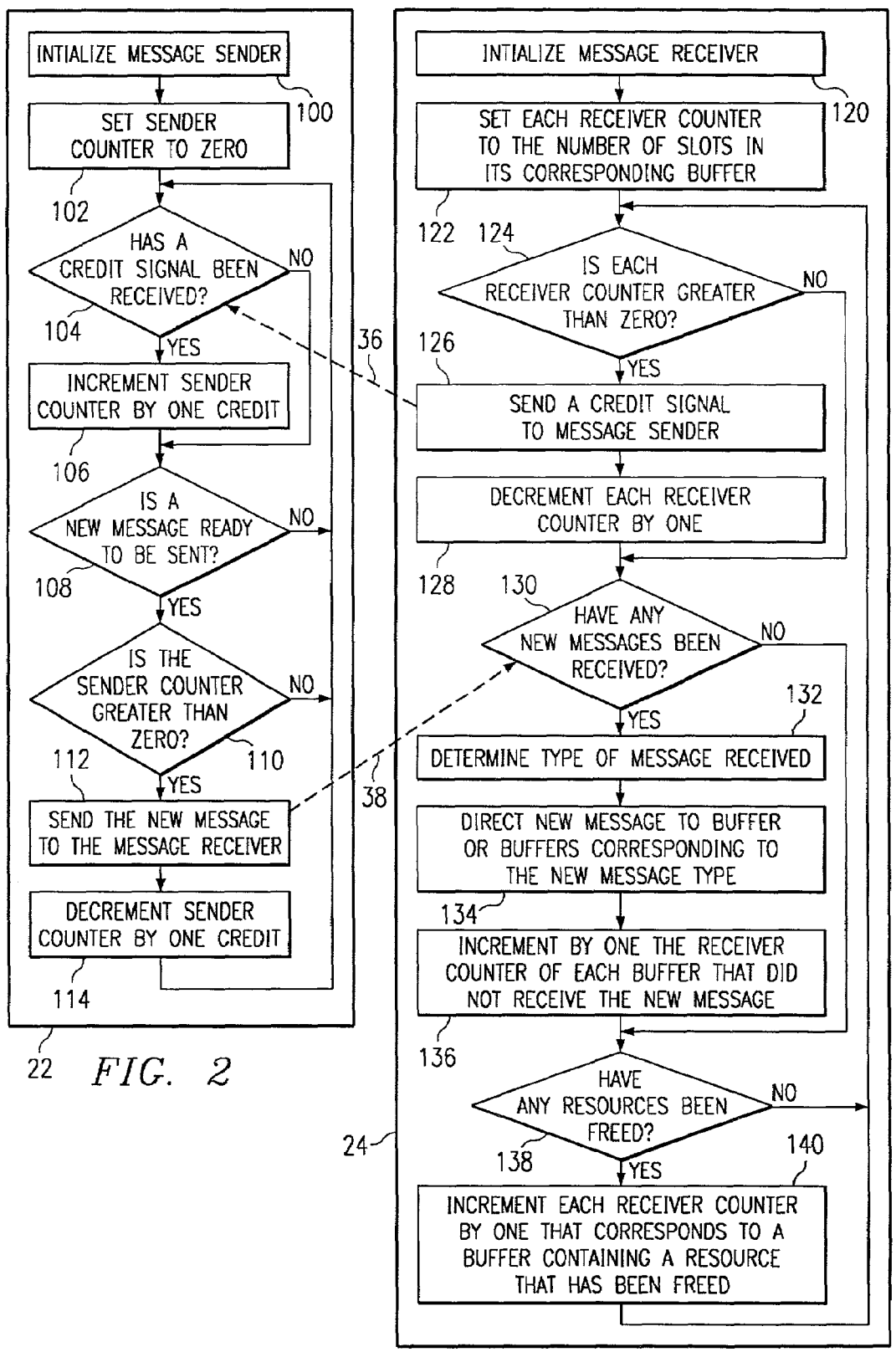
FIG. 2 is a flow chart illustrating an embodiment of the present invention.

FIG. 2 is a flow chart of an embodiment of the process for covering multiple resources with a single credit in accordance with the present invention. In block 100, the message sender 22 is initialized. In block 102, the sender counter 48 is set to zero and in block 104, it is determined whether one of the credit signals over line 36 has been received by the message sender 22. If the credit signal over line 36 has been received, then the sender counter 48 is incremented in block 106 by one credit. Whether or not the credit signal on line 36 has been received, in block 108, it is determined whether a new message 38 is ready to be sent. If a new message 38 is not ready to be sent, then the process returns to block 104 to determine if a new credit signal 36 has been received. If a new message 38 is ready to be sent, in block 110, it is determined whether the sender counter 48 is greater than zero. If it is not, the process returns to block 104. If the sender counter 48 is greater than zero, then in block 112 the new message 38 is transmitted to the message receiver 24 and in block 114 the sender counter 48 is decremented by one credit and the process returns to block 104.

As a person of ordinary skill in the art would recognize, in other embodiments, many of these steps can be practiced in parallel or in a different order. For example, decision blocks 104, 108 and 110 can be conducted in parallel or in a different order. Similarly, blocks 112 and 114 can be conducted in parallel or in a different order.

With respect to the message receiver 24, in an embodiment, the message receiver is initialized in block 120. In block 122, each receiver counter 40 is set to the number of slots 34 in its corresponding buffer 26. In block 124, it is determined whether each receiver counter 40 is greater than zero. If each receiver counter 40 is greater than zero, in block 126 a credit signal over line 36 is sent to the message sender 22 and in block 128 each receiver counter 40 is decremented by one. Whether or not each receiver counter 40 is greater than zero, in block 130, it is determined whether any new messages 38 have been received. If a new message 38 has been received, in block 132 the type of message received is determined, in block 134 the new message 38 is transferred to the buffer(s) 26 corresponding to the type of new message and in block 136 the receiver counter 40 for each buffer 26 that did not receive the new message 38 is incremented by one. Whether or not any new messages 38 have been received, in block 138 it is determined whether any slots 34 have been freed. If a slot 34 has been freed, in block 140 each receiver counter 40 that corresponds to a buffer 26 containing a slot 34 that has been freed is incremented by one. Irrespective of whether a slot 34 has been freed, the process returns to block 124 to determine whether each receiver counter 40 is greater than zero.

A person of ordinary skill in the art would recognize that many of the above-described steps in another embodiment could be implemented in parallel or in a different order. For example, decision blocks 124, 130 and 138 could take place in parallel or in a different order. Similarly, blocks 126 and 128 could occur in parallel or in a different order.

By using the process of the present invention, a more efficient usage of resources is obtained. The resources are used in a cooperative way to send one credit when all of the buffers 26 have a resource free but yet returns a credit more quickly than would be the case with a more simplistic approach. The process allows for more complex internal functions while still communicating by means of a simple channel with only one credit. The FIFO buffer can be eliminated. Further, the system and method can be used with a conventional message sender because the message sender does not see the logic or the multiple resources associated with system. Rather, the message sender 22 only sees the message receiver 24 and only receives the same credit signal over line 36 it received from conventional systems. That the message receiver 24 only sends a credit signal over line 36 when all buffers 26 have at least one resource free is invisible to the message sender 22. The present invention increases memory utilization, provides higher bandwidth and lowers latency.

Thus, it is apparent that there has been provided, in accordance with the present invention, a method and system for covering multiple resources with a single credit in a computer system that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A method for communicating to a sender an availability of receiving a new message in a plurality of buffers each having at least one slot for storing the new message comprising:
    determining whether there is at least one slot available in each of the buffers for receiving the new message; and
    providing a count for each of the buffers;
    providing a credit signal to the sender only when all of the buffers have a count with a non-zero value;
    decrementing the count for each buffer in response to the credit signal being provided to the sender.

2. A method according to claim 1 further comprising;
    monitoring the buffers to determine whether at least one slot in each of the buffers is available for storing the new message.

3. A method according to claim 1 further comprising:
    identifying which of the buffers is to receive the new message;
    inserting the new message into the identified buffers;
    incrementing the count for those buffers that do not receive the new message.

4. A method for communicating to a sender an availability of receiving a new message in a plurality of buffers each having at least one slot for storing the new message comprising:
    determining whether there is at least one slot available in each of the buffers for receiving the new message; and
    providing a credit signal to the sender only when all of the buffers have at least one slot available for storing the new message;
    providing a count for each of the buffers;
    decrementing each count when all of the buffers have at least one slot available for storing the new message.

5. A method according to claim 4 further comprising configuring at least one of the buffers to receive a particular message type.

6. A method according to claim 5 further comprising:
    receiving the new message from the sender having an associated message type;
    loading the new message into the slot of the at least one of the buffers which is configured for receiving the particular message type of the new message.

7. A method according to claim 6 further comprising determining the particular message type of the new message.

8. A method according to claim 7 further comprising incrementing the count of each of the buffers in which the new message was not loaded.

9. A method according to claim 8 further comprising, after the loaded new message is freed from the buffer in which it was loaded, incrementing the count of the buffer in which the new message was loaded.

10. A method according to claim 9 wherein each of the buffers includes a plurality of slots.

11. A method according to claim 10 further comprising:
    initializing the slots of the buffers; and
    prior to loading a first message into the initialized slots of the buffers, setting each of the counts equal to the number of the initialized slots in its corresponding buffer.

12. A method according to claim 1 wherein the plurality of buffers includes six buffers.

13. A method according to claim 1 further comprising configuring each of the buffers with a different particular message type.

14. A system for communicating to a sender an availability of receiving a new message comprising:
    a plurality of buffers each having at least one slot for storing a message; and
    a corresponding counter for each of the buffers;
    a credit signal generator operable to provide a credit signal to the sender only when all of the plurality of buffers have a non-zero value in their respective counter, each counter operable to decrement its value in response to the credit signal being provided to the sender.

15. A system according to claim 14 further comprising:
    a monitor that monitors each of the buffers to determine whether at least one slot is available in each buffer for storing the new message.

16. A system according to claim 14 further comprising:
    a router operable to identify which of the buffers is to receive the new message, the router operable to insert the new message into the identified buffers, the router operable to initiate incrementing of the counter associated with those buffers that do not receive the new message.

17. A system for communicating to a sender an availability of receiving a new message comprising:
    a plurality of buffers each having at least one slot for storing a message; and
    a credit signal generator operable to provide a credit signal to the sender only when all of the plurality of buffers have at least one slot available for storing the new message;
    a corresponding counter for each of the buffers, wherein each counter is configured to be decremented when all of the buffers have at least one slot available for storing the new message.

18. A system according to claim 17 wherein each of the buffers is configured to receive a particular message type.

19. A system according to claim 18 wherein at least one of the slots of a particular buffer which is configured for receiving the particular message type of the new message is configured to load the new message received from the sender.

20. A system according to claim 19 further comprising a message type discriminator configured to determine the particular message type of the new message received from the sender.

21. A system according to claim 20 wherein the counter of each of the buffers in which the new message was not loaded is configured to be incremented.

22. A system according to claim 21 wherein the counter of the buffer in which the new message was loaded is configured to be incremented after the loaded new message is freed.

23. A system according to claim 22 wherein each of the buffers includes a plurality of slots.

24. A system according to claim 23 wherein the slots of the buffers are initialized, and wherein, prior to loading a first message into the initialized slots of the buffers, each of the counters of the initialized slots are configured to be set equal to the number of the initialized slots in its corresponding buffer.

25. A system according to claim 14 wherein the plurality of buffers includes six buffers.

26. A system according to claim 17 wherein at least two of the buffers are configured to receive a different particular message type.

* * * * *